Figure 1:
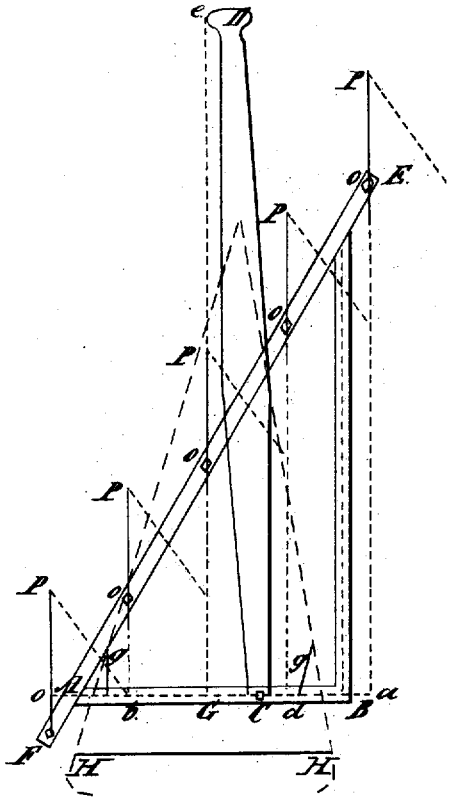
Figure 2:
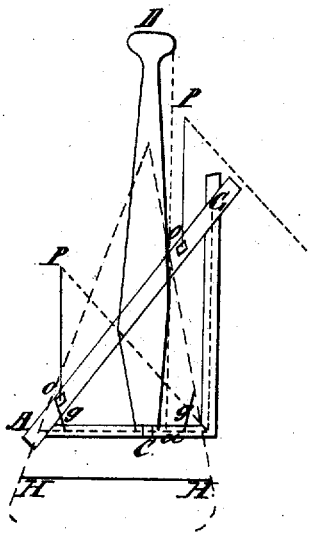

8965X

S. CLIME.

Cultivator.

Patented July 17, 1835.

AM. PHOTO-LITHO. CO. N.Y. (OSBORNE'S PROCESS.)

8965X July 14. 1835

Samuel Cline
Letters Patent.

the Schedule referred to in these Letters Patent and making part of the same, containing
a description in the words of the said Samuel Cline himself of his improvement
in the Plough Specification or description of Samuel Cline's newly inven
ted and improved Combined Plough" being a machine for ploughing in light free
soil. for ploughing in Grain dressing Indian Corn and all other light work of
a similar kind. The principle of combination on which the due construction of the
machine depends is to place the line of draft or beam so that the resistance to be
overcome may bear equally on both sides of that line. To effect this the beam
to which the Horses are attached must be inserted five inches to the right of the mid
dle of the hind beam. and bear to the left just so much that a perpendicular
raised on the centre of said hind beam will touch the end of the main beam.
The transverse beam crosses the beam of the Plough at an angle of sixty degrees.
The proportion used and found convenient are about ten inches in length and
eight in bredth. and the turn of the mould board should be very little be
yond a perpendicular from the hinder corner of the share. The Plough consists
simply of Mould board, land side, and sheath or standard. The mould
board is drawn and flattened out at the lower edge so as to supply the place of
a share. These should be [illegible] of iron and steel either hammered & rolled, or cast,
at the pleasure of the maker and fastened into the transverse beam by the standard
with a shoulder on the under side of the beam fitted to an iron collar and screw
and nut or strong wedge on top of the beam. The standards are made fourteen
inches in height, and the draft or depth of the Plough is regulated by a screw
and wedge at the insertion of the main beam, and the hinder beam. The whole
length of the beam being five feet two inches. The machine is found to work
well with Ploughs of eight inches in bredth placed at the distance of fourteen
inches from each other. thus cutting about ten inches each and using five
Ploughs. Two horses are able to work the combined Plough quite easily and
to pass over as much land in a day as three teams of two horses each with a
common single Plough. Figure No 2. is the principal improvement in the
"combined Plough" which is calculated for two or three Ploughs only. the main
beam

8965X being inserted in a perpendicular line to the hinder beam. The moulds are formed in the same shape and of the same material as those in Figure No 1. but with the addition of a cutter made of steel and secured to the land side and extending two or three inches beyond the mould so as to supply the place of a coulter. This improvement to the machine is used for ploughing a sod or any other ground in handsome order. To construct a combined Plough Figure No 1. draw the line A.B. equal 2 feet. at A draw the transverse beam A.C. making the angle B.A.C. equal 60°. and the beam C.F. equal 4 feet 9 inches, bisect A.B. in G. and erect a perpendicular G.e. and where this crosses the transverse beam, is the place of the centre place g.h. divide said beam in equal parts at the points O.O. for the insertion of the other Ploughs at 5 inches to the right of the centre G insert the beam C.D. 2 inches wide and 5 feet 2 inches long. Set it bear to the left so that the end A.D. will touch the line G.e. At C. insert a screw and wedge for raising and depressing the beam C.D. so as to plough any required depth. To construct a "Combined Plough" Figure No 2. draw the baseline A.B. equal 15½ inches. B.G. equal 21. inches and the transverse beam A.G. 26 inches making the angle B.A.G. = 60° at 5½ inches from B insert the beam C.D. 3 feet in length. make A.a. 3½ inches and c.c. 17½ inches also B.A. 4 inches. At C. insert the screw and wedge as in No 1.

Ex'd Witnesses Samuel Cline

W.H. C.G. McDowell

Hugh H. Henry (Drawing)

764 words